United States Patent [19]

Himmel

[11] 4,020,463
[45] Apr. 26, 1977

[54] APPARATUS AND A METHOD FOR STORAGE AND RETRIEVAL OF IMAGE PATTERNS

[75] Inventor: David P. Himmel, Dallas, Tex.

[73] Assignee: Recognition Equipment Incorporated, Dallas, Tex.

[22] Filed: Feb. 27, 1976

[21] Appl. No.: 661,814

[52] U.S. Cl. ............ 340/146.3 AE; 340/146.3 SY
[51] Int. Cl.² ...................................... G06K 9/00
[58] Field of Search .......... 340/146.3 H, 146.3 AC, 340/146.3 AE, 146.3 AH, 146.3 MA, 324 A, 324 AD, 146.3 SY; 178/DIG. 3

[56] References Cited
UNITED STATES PATENTS

| | | | |
|---|---|---|---|
| 3,541,511 | 11/1970 | Genchi et al. | 340/146.3 AC |
| 3,846,754 | 11/1974 | Oka et al. | 340/146.3 MA |
| 3,889,234 | 6/1975 | Makihara et al. | 340/146.3 MA |
| 3,899,771 | 8/1975 | Saraga et al. | 340/146.3 MA |
| 3,987,412 | 10/1976 | Morrin | 340/146.3 AE |

OTHER PUBLICATIONS

Deutsch, "Computer Simulation of a Character–Recognition Machine–Parts 1 & 2," Post Office Electrical Engineers Journal (England), vol. 60, Apr. & July, 1967, pp. 39–44, 104–109.

*Primary Examiner*—Leo H. Boudreau
*Attorney, Agent, or Firm*—John E. Vandigriff

[57] ABSTRACT

A line image or a line signature is optically scanned to generate digital signals for storage in an image matrix. These digital signals represent black and white cells defining the line signature or line image and are initially processed by tracing the image boundary. During the tracing a "thinning" or "peeling off" operation is performed that evaluates black cells in the image matrix for conversion into white cell digital signals. This thinning or peeling off process, also identified as data compression, continues until the line signature or line image is composed of a single cell thickness. The final phase of the data compression operation includes another boundary tracing of the one cell thick image, and connecting a sequence of boundary points defining each black cell to form a string of vectors which represent the signature. The resulting vector catalog comprises a composition of data including a vector starting point and vector directions which are encoded and stored for future retrieval. When a stored line signature or line image is to be retrieved for display, the encoded vector data is recalled from storage to generate on a cathode ray tube the original vector data. This operation is known as data decompression and produces on the cathode ray tube a synthesis of the original line image or line signature. The compression and decompression operations, except thinning or peeling off, are also applicable to textured images or images having grayscale and thickness. Such textured images are first subdivided into binary images, each representing one bit of the grayscale, then the vector boundary encoding process is completed without thinning. The encoded vectors are stored for subsequent retrieval and display.

11 Claims, 23 Drawing Figures

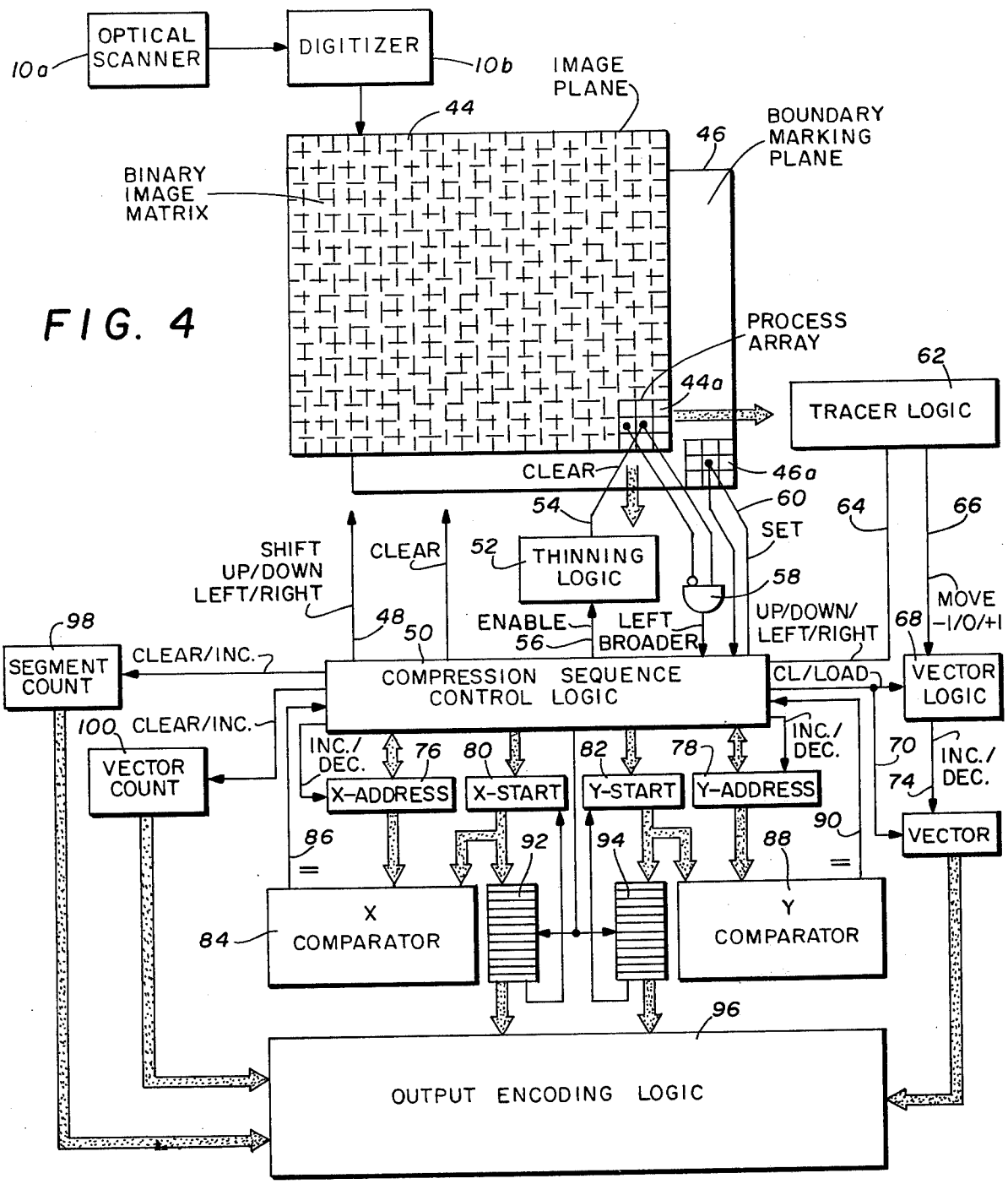
FIG. 4
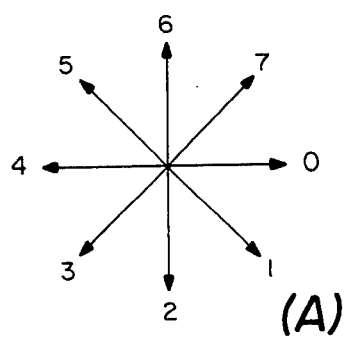
(A)   FIG. 5   (B)

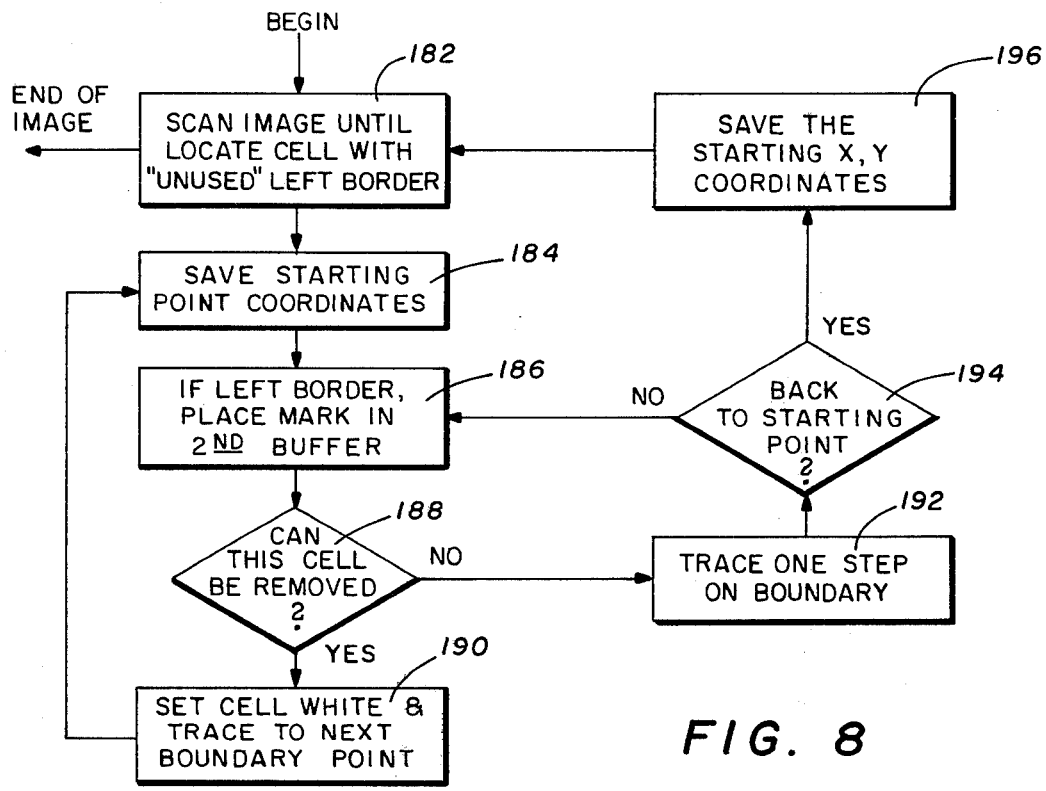
FIG. 8
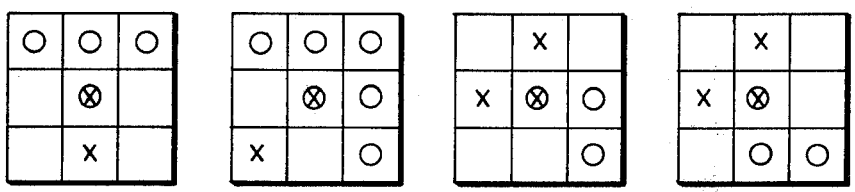
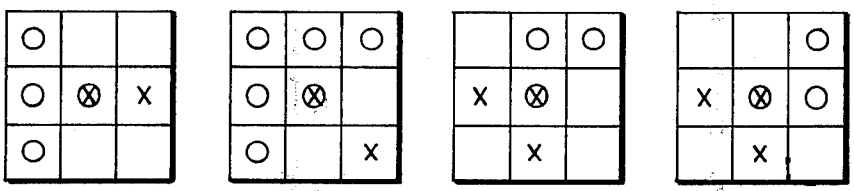
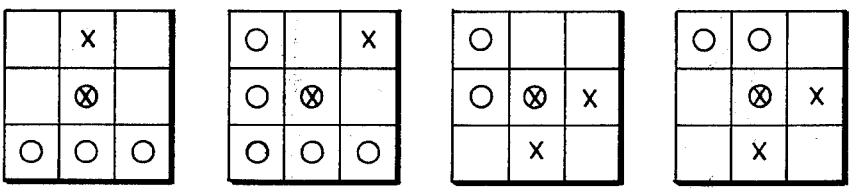
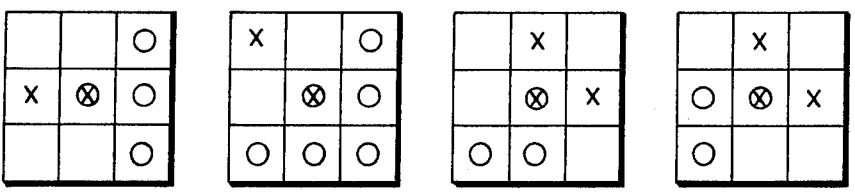
FIG. 9

FIG. 15
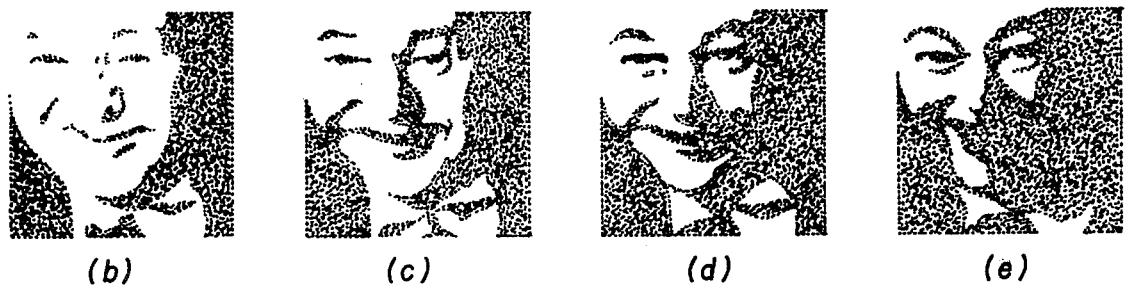
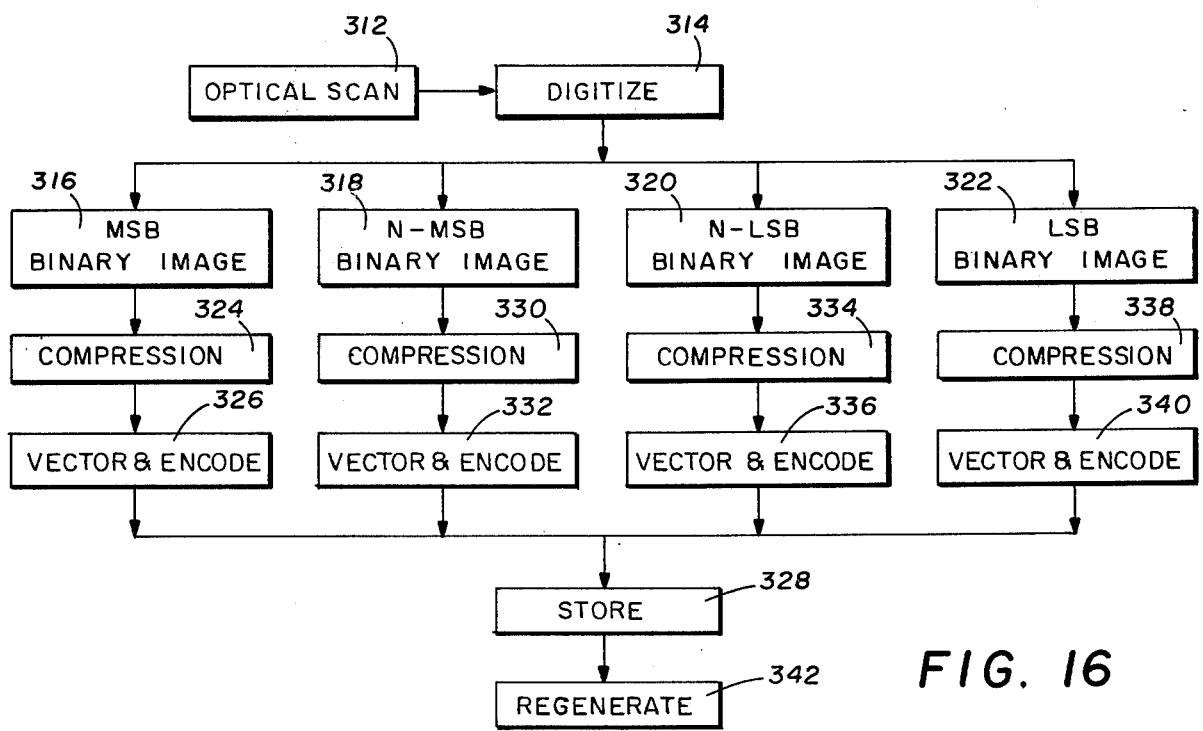
FIG. 16

APPARATUS AND A METHOD FOR STORAGE AND RETRIEVAL OF IMAGE PATTERNS

This invention relates to apparatus and the method of storage and retrieval of image patterns, and more particularly to data compression of an original image pattern for storage and retrieval by a decompression technique.

Heretofore, storage and retrieval of line signatures, portraits and patterns in general have been handled by one of three different methods categorized as: (1) paper files, (2) microfilm files, and (3) electronic files. Of these three categories, the first is the earliest in use and is still the most commonly used by industry. With the paper file method, an original signature card, with or without a portrait or other line drawing, is prepared on hard copy, with or without duplicates, and manually placed in a filing cabinet, or shelf storage, or in slotted files. The retrieval system for this first method is simply the manual removal of the hard copies when needed for the visual comparison after which the copy is refiled. This method is particularly slow and the files quite rapidly become very large and bulky thereby making retrieval difficult and in many cases haphazard, especially when the number of images that are stored equals tens or hundreds of thousands.

A significant limitation of this first method is that the retrieved copy must be viewed locally; for remote review from the storage site the hard copy on which the image appears is placed in front of a television camera, and the image transmitted through a remote television monitor. This remote review thus requires two operators for each image identification. The principal objections to this first method are that manual retrieval is still required and a good quality, high speed, expensive video communications channel is necessary between a camera and a monitor for remote comparison.

Method two of the three mentioned above, that is, microfilm storage, is also in general use throughout the industry. With this method of storage and retrieval, line signatures, portraits and other image patterns to be stored are photographed and retained in the form of a microfilmstrip or on a microfilm card. These filmstrips or film cards are stored either in file cabinets or in film projectors for future retrieval when the need for comparison arises. Retrieval of the microfilm is completed either manually from the file cabinets or automatically in the case of the film projector storage. This latter storage is usually implemented by means of filmstrip wound on reels removable from the film projector with each frame on the film-strip numerically identified for retrieval purposes. An electro-mechanical device can reference the correct film frame by virtue of the identifier marks accompanying each frame and then position the frame in front of an optical projector or viewer.

For remote viewing, as in the first method, the film is projected by means of television equipment to a remote viewer. Again, the microfilm storage method requires two operators, one to locate the film frame and the second for the comparison recognition. Microfilm storage has drawbacks similar to the card storage system of method one. An advantage of microfilm storage over card storage is that the microfilm is more compact but the manual or electromechanical retrieval process is still quite slow.

The electronic file method is the newest of the three as recent developments have made it possible to have image storage and retrieval using electronic apparatus. Typically, presently available electronic apparatus for image storage and retrieval includes devices for optically scanning and digitizing the line signature, portraits or other image patterns. The digitized data is then compressed and stored in memory of a central computer or other digital storage medium. Retrieval of the stored data is also accomplished through electronic apparatus usually remote from the central computer and accomplished by means of a CRT display.

Present day compression techniques require that images be reconstructed, or decompressed, before transmission to the possibly remote display device. This necessitates a significantly wide transmission bandwidth and relatively long transmission line, all with attendant expense, to communicate the image from a central storage computer to the display terminal. Present day compression techniques are primarily intended for general purpose use on textured images (images with significant thickness to individual parts and gray shadings), with compression ratios in the range of 3:1 to 10:1, depending on the particular image. Some of the presently used image compression techniques include various "run length" coding approaches in which the image is examined row by row, and output coding is achieved only when succeeding digital cells within the row have different values for the scan data.

Another conventional electronic compression technique uses "predictive codes", which makes use of previous history and knowledge of the distribution and interrelations between adjacent image cells to predict new values based on what occurred before. That is, some of the image cell information is not transmitted and the receiver, or image reconstruction device, is allowed to predict the missing information. Another presently used compression technique is known as "differential compression" which utilizes the difference between adjacent cell values, which on the average, are less than the absolute value. Still another presently available approach to compression is to transform the image according to a mathematically orthogonal function and than truncate the terms of the transformation, which achieves data compression; with the image reconstructed, albeit with some distortion, by applying the inverse transform to the truncated terms.

A feature of the present invention is to provide apparatus and a method of electronic storage and retrieval for image patterns that provides a faster, more economical, and more effective means of storing and retrieval of large amounts of graphic data. This is accomplished by providing an improved compression technique which yields much higher data compression ratios for graphic data than the traditional compression techniques described above, Higher compression ratios mean that less data is stored, with accompanying benefits of minimum storage costs and faster storage and retrieval times.

Another feature of the present invention is to enable the transmission of compressed data from storage in a central controller to a remote viewing site and reconstruction of the graphic data at the remote terminal. This is achieved by an efficient decompression or reconstruction of the original compressed graphic data which complements the compression technique, and is simple and operationally fast. Transmission of the compressed data to a remote terminal for decompression achieves a significant communications cost reduction and further minimizes transmission times.

In accordance with the present invention, line signatures, portraits or other graphic data is optically scanned and analog signals therefrom digitized into binary (black/white) data for storage in a buffer matrix. The binary data in the buffer matrix is compressed into a skeletonized version of the original image by progressive, iterative, scanning of the boundaries without introducing undue distortion in accordance with a set of rules built into the compression apparatus. This skeletonized image contains only one cell thick lines and includes all essential information about the image.

Following compression of the binary data, a sequence of coordinates and vector values are generated which completely described the skeletonized image. The system of coordinate values determines the location of the parts of the image in an absolute sense, while the vector values relate adjacent image cells to one another in a relative sense. The coordinates and vector values enable compact encoding that minimizes the data required to represent these values. The encoded coordinate and vector values are the compressed data of the original graphic image and it is these values that are stored in memory of a central controller.

For retrieval, the coded coordinates and vector values are decoded in a regeneration process that is the reverse of the encoding scheme. Following regeneration of the sequence of coordinate and vector values, a decompression step is completed to reconstruct the line signature, protrait or other graphic image as binary (black/white) cells defined by the decoded coordinate and vector values.

Also in accordance with the present invention, apparatus for compressing a digitized input pattern of data having a multiple bit width by the removal of redundant information into a vector pattern includes buffer storage for storing in matrix form each value of digitized input data produced by pattern scanning. A data scanner responds to each bit of the input data in the image matrix and generates a boundary signal at a transition between a data bit of a first value and a data bit of a second digital value. Apparatus of the present invention further includes means for tracing the boundary outlined by the stored input data in response to the boundary signal, and changing the value of redundant information bits during the boundary tracing from the first digital value to the second digital value. Further, there is included means responsive to each information bit of the first digital value after completion of the boundary tracing to generate a vector encoded representation of the input pattern, where each vector has a direction based on surrounding data bits of the first and second digital values. The encoded representation of the vectors are stored in recoverable memory.

The novel features believed characteristic of the invention are set forth in the appended claims. The invention itself, however, as well as further advantages thereof, will best be understood by reference to the following detailed description of an illustrative embodiment taken in conjunction with the accompanying drawings.

Referring to the drawings:

FIG. 4 is a detailed logic diagram of the compression unit of FIG. 1 responsive to digitized binary data and generating encoded coordinate and vector values;

FIGS. 5A and 5B illustrate various possible vector directions and rules for determining a vector direction;

FIG. 8 is a flow diagram of the operation of the thinning logic of FIG. 4;

FIG. 9 is a series of illustrations of a set of rules for determining whether a particular black value is to be changed into white data;

Figure 1:
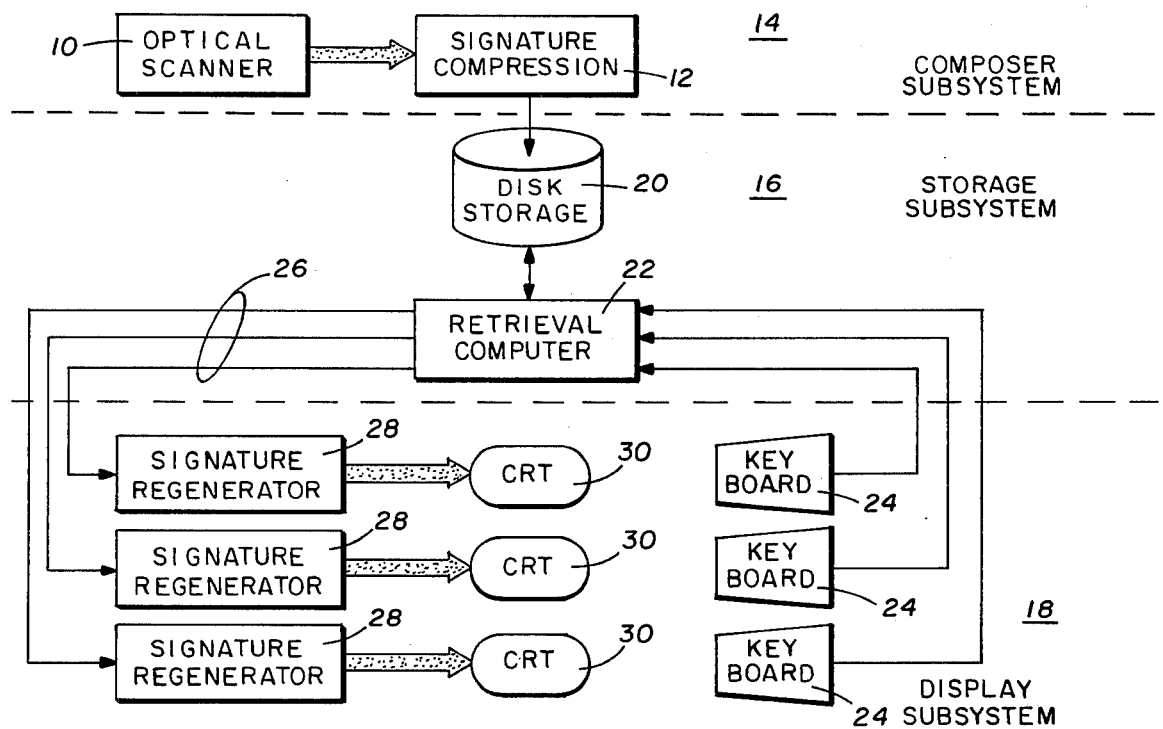
FIG. 1 is a block diagram of the major parts of apparatus for electronic storage and retrieval of line signatures, portraits or other image data.

FIGS. 15A–E are a series of illustrations for describing a portrait in accordance with the present invention; and FIG. 16 is a block diagram of a system for compressing, storing and regenerating the portrait of FIG. 15a.

While the invention will be described with reference to a signature vertification or validation system, it will be understood that it finds utility in other areas where graphic data is to be stored and later retrieved for dispay. Line signature images, for example, are widely used for validation of personal identity during monetary transactions. In accordance with the present invention, this validation or signature verification is accomplished by comparing a known standard signature retrieved from a file of such standards, to a signature presented for verification or validation. The standard signatures are electronically stored as coordinate and vector values in a centralized storage area where the centralized storage may consist of large banks of stored signatures in digital data form for transmission to remote cities quickly and economically.

In addition to finding usefulness in monetary transactions, signature verification or validation is also widely used to provide secure entry to areas where only authorized personnel are allowed.

As mentioned, in addition to signature verification, the present invention finds utility in the fast, economical and easy storage and retrieval of blueprints and other line drawings.

The method of the present invention, as it relates to line signature verification, includes optically scanning the images on a document to generate analog signals and converting the analog signals from the optical scanner into a digital data form for processing. The digital data images are processed so as to produce a compact representation of the original line signature which contains all of the essential information of the original image. This compact, or compressed, representation is then stored in a digital format in a storage device, such as a magnetic disc or tape, and retained for future use. Compression of the original image into a skeletonized form reduces the storage requirements over that required for the original, uncompressed image. The more compact the representation, the higher the compression ratio, the smaller the storage requirements.

For validation at a remote terminal, the stored data is retrieved and displayed by a synthesization of the original image from the stored data. Storage of the compressed data representation of the original image makes the retrieval process fast and efficient. Following retrieval, the image is reconstructed to its original form (decompressed) from the compact representation, and finally, a replica of the original image is displayed.

The key steps of the process for signature validation is the compression of the original data at a high compression ratio and the decompression to achieve image reconstruction in an efficient process so as not to interfere with other retrieval and display stations.

Referring to FIG. 1, there is shown a general representation of apparatus for storage and retrieval of graphic data, for example, a line signature, wherein an optical scanner 10 responds to the graphic data and produces digitized binary black and white data signals to a signature compression network 12. The optical scanner 10, for example, provides a photoelectric conversion of the graphic data into electrical signals by light reflected from the data. This scanner may consist of any well known photoelectric conversion unit including a flying spot scanner, vidicon tube or a rectangular matrix of photoelectric cells. The scanning is accomplished by conventional techniques where the graphic data is scanned by a plurality of vertical or horizontal lines sequentially crossing the data pattern and moving from the end of each line to the beginning of the next line by virtue of generated synchronized clock pulses. Analog electric signals from the photoelectric conversion are digitized into signals which are either at a logic one level (a black cell) or a logic zero level (a white cell).

Basically, the system of FIG. 1 comprises three main subsystems: a composer subsystem 14, a storage subsystem 16, and a display subsystem 18. The composer subsystem 14 includes a means to feed documents (not shown) past the optical scanner 10 a single document at a time for transporting to a stack after scanning is complete. Analog signals from the photoelectric conversion process are digitized and applied to the signature compression network 12. The signature compression network 12 comprises logic circuitry for providing encoded coordinate and vector values to a disc storage 20 of the storage subsystem 16 from the digitized data supplied by the optical scanner 10.

Digital coordinates and vector values stored in the disc storage 20 are read out on demand by a retrieval computer 22 forming the second key element of the storage subsystem 16.

As mentioned, the disc storage 20 may comprise any number of digital storage devices such as magnetic discs, magnetic drum, tape storage, digital core memory or semiconductor memory. The disc storage also includes means to selectively address the memory elements and to read and write the compressed information into and out of the memory in accordance with demands from the retrieval computer 22.

Signature data to be retrieved from the disc storage 20 is called by addressing one of the keyboards 24 of individual remote stations as part of the display subsystem 18. The retrieved signature data is transmitted over a communication network 26 to the appropriate signature regenerator 28 for display on one of the CRT viewers 30. The communication network 26 between the storage subsystem 16 and the display subsystem 18 may be slower voiced telephone lines since compressed data is transmitted from the disc storage 20 rather than a reconstructed image over the high speed digital channels conventionally used.

The process for displaying a line signature from the disc storage 20 is initiated by a request from one of the keyboards 24, with this request relayed to the storage subsystem 16 which then transmits the correct compressed data back to the signature generator of the appropriate remote terminal where the original image is reconstructed by a decompression process for subsequent display on a CRT viewer 30.

Figures 2, 3:
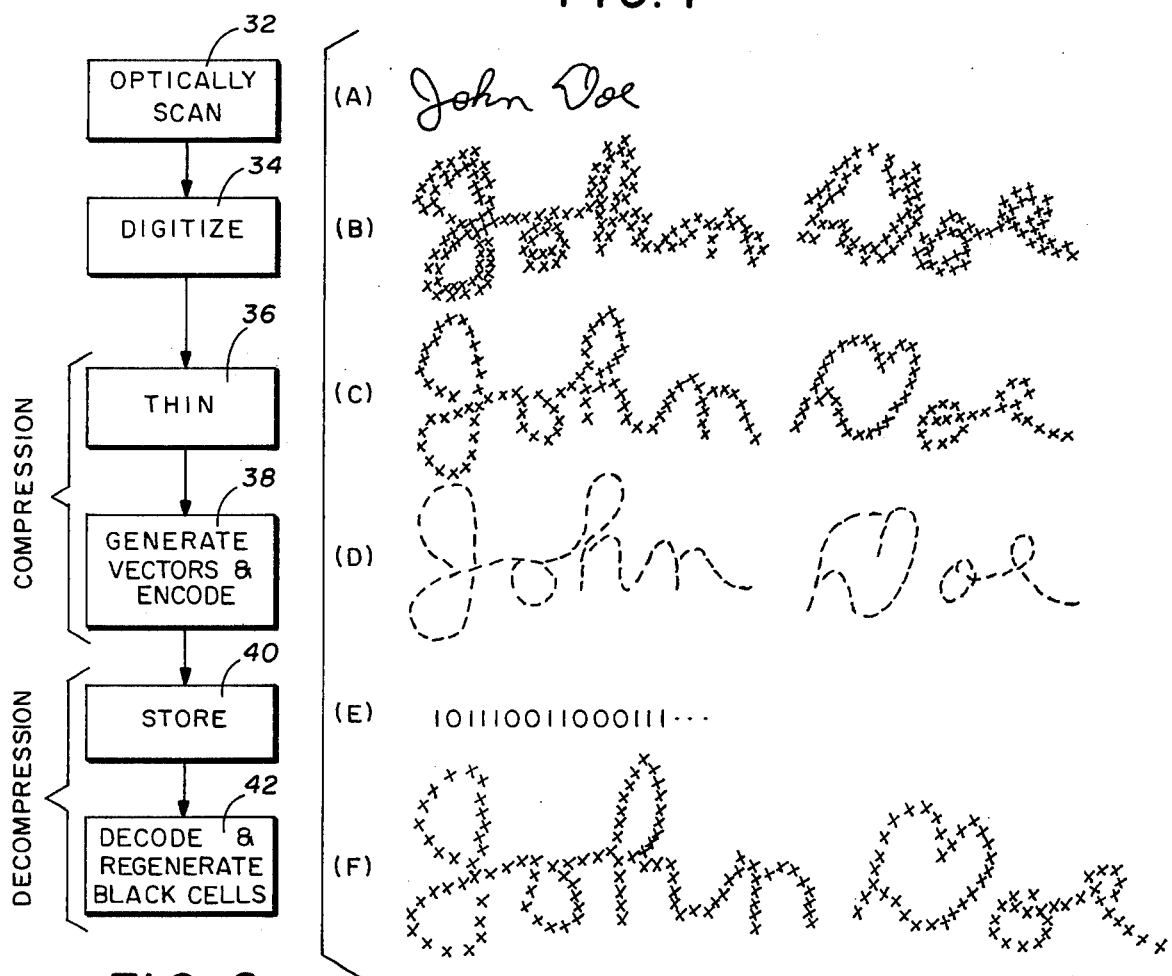
FIG. 2 is a flow chart of the process in accordance with the present invention for compressing image data and generating coordinate and vector values for storage and future retrieval and display.
FIG. 3 is a sequence of illustrations of the various steps for compressing a line signature and encoding into digital format for storage and future retrieval, with each illustration associated with a step of the flow chart of FIG. 2.

Referring to FIG. 2, there is shown in block form the process for storing and retrieval of a line signature with the processed results for the various steps shown by way of a signature example shown in FIG. 3.

An original line signature on a document is illustrated in FIG. 3a and this image is scanned in an optically scan step 32 of FIG. 2. Next, signals from the optical scan step 32 are digitized in a step 34 so that the signature is represented by discrete, black cells in a white matrix as graphically illustrated at FIG. 3B. The next two processing steps, thinning 36, and generating vectors and encoding 38 make up the image compression steps of the process of the present invention. In the thinning step 36, the representation of FIG. 3B is boundary traced while layers of black cells are peeled off until the signature representation consists of lines which are one cell thick as illustrated in FIG. 3C. The second step of compression is generating vectors and encoding where the skeletonized image is again boundary traced to generate vectors for tying adjacent cells together, as illustrated in FIG. 3D. Also during the step of generating vectors and encoding 38, the vectors are encoded into a series of binary digits (bits) representing the coordinates and direction of the vectors relative to each other.

Upon completion of the compression stage of the process of FIG. 2, the next step is storing the encoded vector data in the form of a variable length record of bits in a step 40. The original signature of FIG. 3A is now represented by a series of binary words comprising logic zeros and logic ones as illustrated in FIG. 3E. The series illustrated is not intended to be a complete codification of the signature of FIG. 3A, but rather represents only one portion of the total signature. It will be understood that the total signature comprises additional binary words identifying coordinates and directions of encoded vectors.

To retrieve the signature of FIG. 3A, the step to decode and regenerate black cells 42 is called by the display subsystem 18. The binary words of FIG. 3E are retrieved from the disc storage 20 and decompressed to reconstruct the original signature as shown in FIG. 3F. The decompression of the binary data from the bit storage 20 is accomplished by decoding the bit stream of FIG. 3E and regenerating black cells by reversing the vector generation process.

Referring to FIG. 4, there is shown a logic block diagram of the composer subsystem 24 including an optical scanner 10a connected to a digitizer 10b providing binary data relating to the black/white cell conditions reflected to the optical scanner 10a. Binary data from the digitizer 10b is written into a binary image matrix comprising an image plane 44 made up of a two dimensional shift register with storage large enough to hold an image of interest. The image plane 44 is arranged in parallel with a boundary marking plane 46 also made up of a two dimensional shift register having storage positions equal in number to the image plane. Thus, the binary image matrix is a two dimensional shift register which, on command, is shifted one position in any of four directions, up, down, left or right in accordance with a shift signal on a line 48 from compression sequence control logic 50.

At the lower right hand corner of the image plane 44 is a process array 44a of nine cells in a two dimensional matrix. A similar nine cell array 46a is identified in the boundary marking plane 46, again as a two dimensional matrix.

Binary data in the process array 44a is applied to thinning logic 52 that under specified conditions of black/white cell data in the process array generates a cell clear signal on a line 54. The thinning logic 52 is enabled by a signal on a line 56 from the control logic 50. Also coupled to the process array 44a is an AND gate 58 for identifying a left border condition, as will be explained. The center cell of the process array 46a is also connected to the control logic 50, and under certain conditions, as will be explained, receives a set signal on a line 60.

Binary data in te process array 44a is applied to tracer logic 62 that provides commands to the control logic 50 over a line 64 to shift the image plane up, down, left or right. The tracer logic 62 also provides a move signal over a line 66 to vector generating logic 68. In addition, the vector logic 68 receives a clear/load command from the control logic 50 over a line 70. This same command on the line 70 is applied to a vector register 72 that is loaded from the vector logic 68 over a line 74.

Each time the control logic 50 commands a shift in position for the data in the image plane 44, an increment/decrement pulse is also generated to an X-address register 76 and a Y-address register 78. The address in the registers 76 and 78 reflects the position of data shifted into the process array 44a.

During the compression of data in the image plane 44, the coordinates of the center cell of the process array 44a that is identified for change from a black level to a white level is fed into an X-start register 80 and a Y-start register 82. These registers receive coordinate data from the control logic 50. Both the X-address register 76 and the X-start register 80 are connected to an X-comparator 84 that generates a command to the control logic 50 when the address of the two registers is equal. This command is generated on the line 86. Similarly, the Y-address register 78 and the Y-start register 82 are coupled to a Y-comparator 88 that generates a command to the control logic 50 on a line 90 when the addresses of the registers are equal.

Also coupled to the X-start register 80 is an X push-down register 92 and connected to the Y-start register 82 is a Y push-down register 94. Both of these registers are shifted by a command from the control logic 50 and form circulating configurations with the corresponding start register. Data from the push-down registers 92 and 94 is applied to output encoding logic 96. The output encoding logic 96 also receives vector data from the vector register 72.

Two additional registers forming a part of the signature compression 12 are a segment count register 98 and a vector count register 100. Both of these registers are cleared and incremented by commands from the control logic 50. Also, both provide data to the output encoding logic 96.

In operation of the signature compression of FIG. 4, data from the digitizer 10b is stored in the image plane 44 at an address relative to other binary data from the digitizer, such that when a complete signature has been scanned by the optical scanner 10a the image plane 44 contains a bit pattern representing the scanned signature. The control logic 50 initiates a scan of the stored bit pattern, cell by cell, along successive columns by shifting the image plane 44 a column at a time into the process array 44a and then shifting a row at a time through the process array until the end of the column is reached. The image plane 44 is again shifted one column and each row is again shifted for evaluation by row and column in the process array 44a.

Each time the bit pattern in the image plane 44 is shifted through the process array 44a, the X-address register 76 and the Y-address register 78 are incremented or decremented such that the address number in the registers 76 and 78 represents the address position of the data at the center cell of the process array.

This shifting of the binary bit pattern continues until a left border is detected by the AND gate 58. When the center cell of the process array 44a is at a black level and the cell immediately to the left is at a white level a border condition exists and the AND gate 58 generates a left border signal to the control logic 50. The scanning of the bit pattern in the image plane 44 is temporarily interrupted and the address in the X-address register 76 is transferred to the X-start register 80 and the address in the Y-address register 78 is transferred to the Y-start register 82. Data in the start registers 80 and 82 now represents the start of an image outline.

Prior to continuing with the compression sequence, the control logic 50 checks the condition of the center cell of the array 46a. If the center cell is at a logic zero level then it has not previously been set, thereby indicating that the present border, as detected in the process array 44a, has not previously been considered. The compression sequence now commences by resetting the center cell shifted into the array 46a to a logic one level and advancing the sequence to boundary tracing.

If upon checking the center cell of the array 46a it was found that the cell had previously been set to logic one, indicating that the center cell in the process array 44a had been previously considered, then the scanning process would resume. This condition exists after one segment of the signature has previously been tracked and thinned by a previous sequence.

With reference to the example of FIG. 3, the scanning process first identifies the top of the h in John as the highest point in the signature example. Upon detecting this part of the name John, the control logic advances the sequence to the boundary tracing of the word John and also enables the thinning logic to skeletonize the pattern of FIG. 3B. Once an image pattern has been located by a left border condition, the scanning is interrupted until the boundary tracing and thinning sequences are complete for the located word, in the example, the name John.

The tracer logic 62 now responds to black/white data in the process array 44a during what will be identified as the first boundary tracing to generate up, down, left or right shift signals to the control logic 50. The tracer logic identifies the direction to shift the image plane 44. This plane is then shifted iteratively under control of the tracer logic 62.

At each shifting of the data in the image plane 44, the control logic 50 enables the thinning logic 52 to evaluate if the black center cell of the process array 44a may be changed to a white cell. When the thinning logic 52 identifies that the center cell of process array 44a may be changed to a white level, a clear signal is generated on the line 54 to the process array to clear the center cell to a white level.

Whenever a cell is cleared to a white level, and after the next shifting command has occurred, the address in the X-address register 76 is shifted into the X-start register 80 and the address of the Y-address register 78 is shifted into the Y-start register 82. Thus, the address in the start registers 80 and 82 is continually updated each time the condition of the center cell of the process array 44a is cleared to a white level.

For each shifting of address data into the start registers 80 and 82, a comparison is made in the comparators 84 and 88. The comparator 84 compares the address in the X-address register 76 with the address in the X-start register 80. When these two addresses are equal a signal is sent to the control logic 50 over the line 86. Similarly, the address in the Y-address register 78 is compared with the address in the Y-start register 82 in the comparator 88. When both the addresses in the registers 78 and 82 are equal, the comparator 88 generates a signal on a line 90 to the control logic 50.

Boundary tracing and thinning of the image pattern, for example, John, continues until both the comparators 84 and 88 indicate an equality in the addresses from the associated registers. This condition exists only after the tracer logic 62 has finished a complete boundary tracing of the image and returned to the last address in the start registers 80 and 82. That is, each time the tracer logic shits the data in the process array 44a, the address registers 76 and 78 are updated to the new address of the center cell of the process array, and this continues until the updated address in these registers equals the last addresses shifted into the registers 80 and 82.

The tracing and thinning procedure continues and each time a cell in the process array 44a is identified as black data that cannot be changed to white and the black data has a white cell to the left, the coordinates of that cell are effectively stored in the boundary marking plane 46 by the control logic 50 generating a set signal on the line 60 to change the center cell of the array 46a to a logic one level. When the entire tracing and thinning functions have been completed, the boundary marking plane effectively contains the coordinates of each of the black level cells of the skeletonized image which is a left boundary cell. Thus, referring to FIG. 3C, the coordinates of each black cell which is a left boundary in the signature John Doe are retained in boundary marking plane 46 as binary ones in appropriate cells.

Upon completion of the thinning function, the X-start register 80 and the Y-start register 82 contain the address in the boundary marking plane 46 of the first cell to be considered for the next step of the compression sequence. The next step of the process is to generate vectors to be encoded into binary words.

To generate vectors from the remaining black cells in the image plane 44, the boudary tracing function is repeated by the tracer logic 62. The sequence of vectors, along with the X and Y starting coordinates from the registers 92 and 94 as shifted from the registers 80 and 82, respectively, will completely represent the skeletonized image of the signature. Each vector extends from one black cell to the next black cell which is one of eight immediate neighbors. The eight possible vectors are numbered from 0 to 7 and represent vectors in 45° increments in a clockwise direction beginning with the 0 vector pointing to the right as shown in FIG. 5A.

In the generation of the vectors of FIG. 5A, they are spaced 45° apart each representing a unit step. The vector numbers are computed by adding plus or minus 1, or 0, to the last vector each time a step is taken by the tracer logic 62. FIG. 5B shows the proper addition for each of three possible steps. The vector numer for the first step taken after register scanning must be correctly initialized, but from then on updating accordng to FIG. 5B will maintain the proper vectors. The eight possible vectors can assume the values shown in FIG. 5A from all these values plus and minus integer multiples of eight. For example, the result of taking four unit steps of −1 from an initial vector of 0 is a vector number −4 which is the same as vector 4. This enables the preservation of sum history of the trace required for certain features of signatures and patterns to be reconstructed.

Initially, the vector generation process is enabled by clearing the segment count register 98, the vector register 72 and the vector count register 100. The X-start register 80 and the Y-start register 82 are initialized to transfer the respective addresses from the bottom of the push-down registers 92 and 94, respectively, into the start registers. The tracer logic 62 generates the up, down, left or right command to the control logic 50 that now generates a shift signal on the line 48 to the binary image plane 44. Data in the binary image plane 44 is shifted, as explained previously, and at the same time the X-address register 76 and the Y-address register 78 are incremented or decremented until the contents of these registers match the contents of the X-start register 80 and the Y-start register 82, respectively. This positions the process array 44a to the starting point on the first black cell to be considered for vector generation.

Under control of the tracer logic 62, each of the black cells in the image plane remaining after the thinning process is evaluated by position relative to neighboring cells to generate vector identification data. Each time the tracer logic 62 identifies another black cell, the signal is generated on the line 66 to the vector logic 68 which generates the vector numbers by incrementing or decrementing the vector register 72 by a signal on the line 74. As each vector is generated, the control logic 50 increments the vector count register 100 that then maintains a running count of the number of vectors generated for an image.

The generation of the vector data continues from cell to adjacent cell in a complete path around a continuous segment of the signature until the address in the X and Y address registers 76 an 78 again equals the address in the X-start register and the Y-start register 82, respectiely, by operation of the comparators 84 and 88. This again is an indication that the tracer logic has tracked around an entire image segment, and the vector generation process is complete. When each section of a signature or image has ben considered for generation of vectors, the control logic 50 increments the segment count register 98 that then maintains a running count of the individual segments of a complete image.

As each vector is computed during the boundary tracing of the skeletonized image, the data in the vector register 72, the segment count register 98, the vector count register 100 and the X and Y coordinates of the starting cell are input to the output encoding logic 96. The output encoding logic converts the generated vector data into a series of binary bits as shown in FIG. 3E for storing in the disc storage 20.

With reference to the signature of FIG. 3A, after John has been encoded for transfer into the storage 20, the scanning of the image plane 44 is resumed to identify the next boundary to be traced. In the example of FIG. 3, the scanning will next identify the letter D and begin to boundary trace and skeletonize this segment of the image. At first, the outer boundary of the D is traced and skeletonized to remove excess black cells. Prior to the generation of binary data for a vector representation of the letter D, the scanning is resumed to identify the inner boundary of this segment. The tracer logic 62 now traces around the inner boundary and thinning of excess black data is completed. By thinning both the outer boundary and the inner boundary of an image, less distortion results and a truer representation of the original image will be regenerated.

After both the outer and inner boundaries of the letter D have been skeletonized, binary data representing vectors to identify the letter are generated by the encoding logic 96 and stored in the disc storage 20.

Scanning of the image plane 44 again resumes to identify the letters OE of the second word of the signature of FIG. 3A. The same outer and inner boundary tracing and thinning of these letters takes place as explained. Also, binary data representing vectors to define the letters OE are generated by the output encoding logic 96 for storage in the disc storage 20.

Figure 6A:
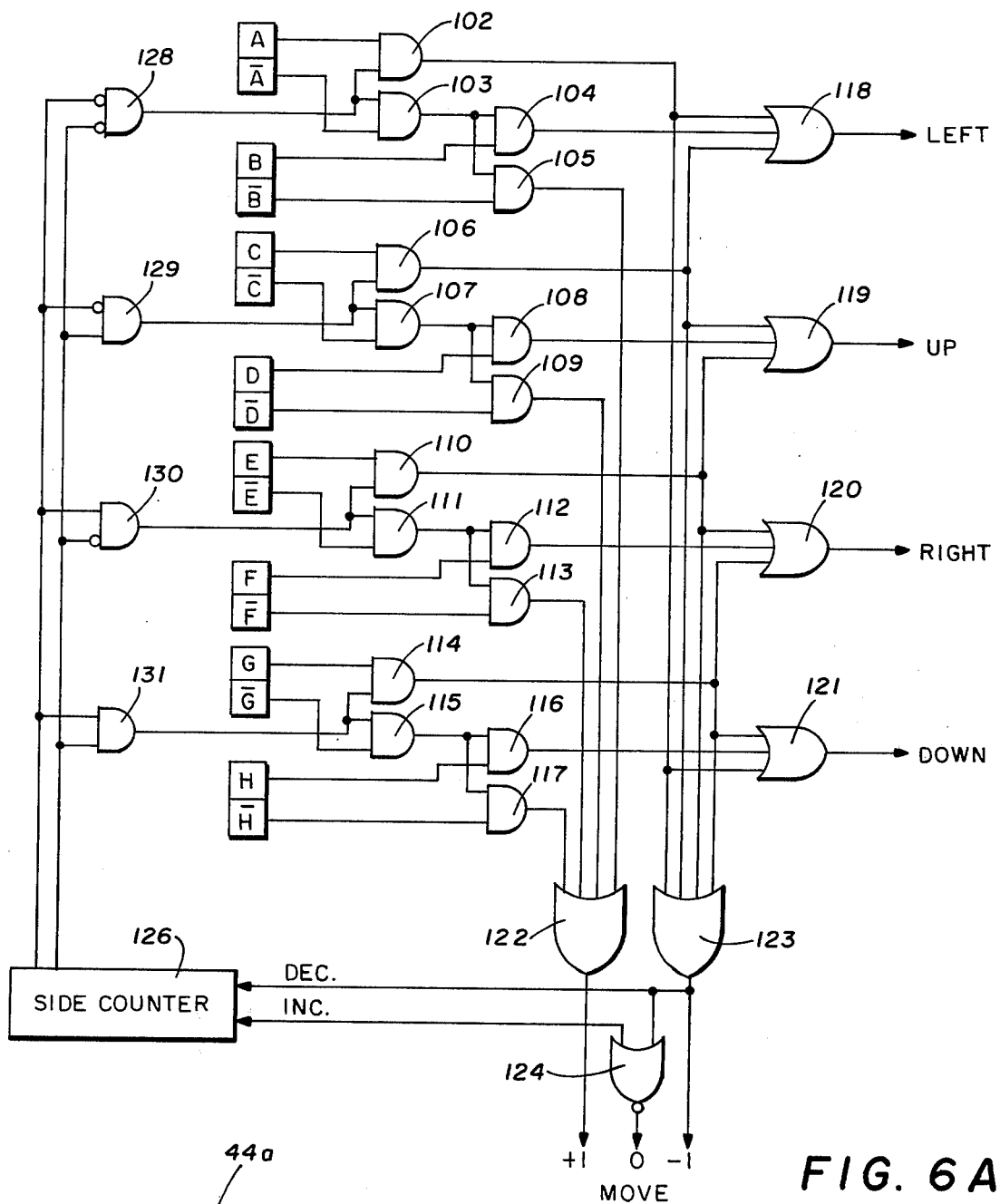
FIG. 6A is a schematic of the tracer logic of FIG. 4 with the operational process of the logic illustrated at FIG. 6B.
Figure 6B:
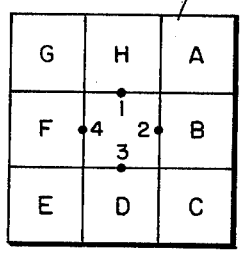

Referring to FIG. 6A, there is shown a detailed logic diagram of the tracer logic 62 comprising AND gates 102–117 connected to cells of the process array 44a as reproduced in FIG. 6B. For example, AND gates 102 and 103 are connected to the A-cell of the array 44a while the AND gates 104 and 105 are connected to the B-cell. Each of the other AND gates 106 –117 are connected in pairs to one of the cells of the image plane 44 as identified by the lettered blocks.

Each of the AND gates 102–117 has an interconnection to one or more OR gates 118–123. The OR gates 118–121 generate the left, up, right and down commands, respectively, to the control logic 50. The OR gates 122 and 123, along with an OR gate 124, generate the control signals to the vector logic 68. Also connected to the OR gates 122 and 123 is a side counter 126 providing count pulses to gates 128–131 for clocking the AND gates 102–117.

In operation of the tracing logic of FIG. 6A, the logic is initialized by the location of a left border of the image stored in the image plane 44. The numbers 1–4 of FIG. 6B indicate the four possible boundaries for the center cell of the process array 44a. Upon the location of a boundary condition between the center cell and one of the surrounding cells, one of the OR gates 118–121 generates a command to the control logic 50. The operation of the tracer logic is symmetrical and may be started at any boundary with the center cell.

Assume that the center cell is black and the cell H is white and the last boundary point was located between the center cell and cell H. Proceeding clockwise around the process array 44a, the next boundary point can be at one of three possible locations depending on the state of cells A and B. The side counter 126 will gate the AND gates 102–105 to evaluate if either cell A or cell B is at a black condition. If cell A is black then the next boundary point is located on the border between cells H and A and the OR gates 118–121 generate commands to the control logic 50 to shift the image plane 44 such that cell A is now at the center of the process array 44a. If cell A is not black, but cell B is a black condition, then the next boundary point is located between cells A and B. Again, the OR gates 118–121 provide the appropriate shift commands to center the B cell in the process array 44a. If both the cells A and B are white the boundary location will be at point 2 of the center cell. Boundary tracing for the center cell of the process array 44a continues by incrementing or decrementing the side counter 126 to gate the appropriate one of the eight lettered cells through the respective AND gates 102–117 to check boundary conditions for the center cell.

The boundary tracing process is completed twice for each identifiable boundary of the image in the image plane 44. The first boundary traced, as explained, is for purposes of thinning or skeletonizing the data and the second boundary tracing is for the purpose of generating vector representations of the skeletonized data. For either tracing, the operation of the logic of FIG. 6A is the same.

Figure 7B:
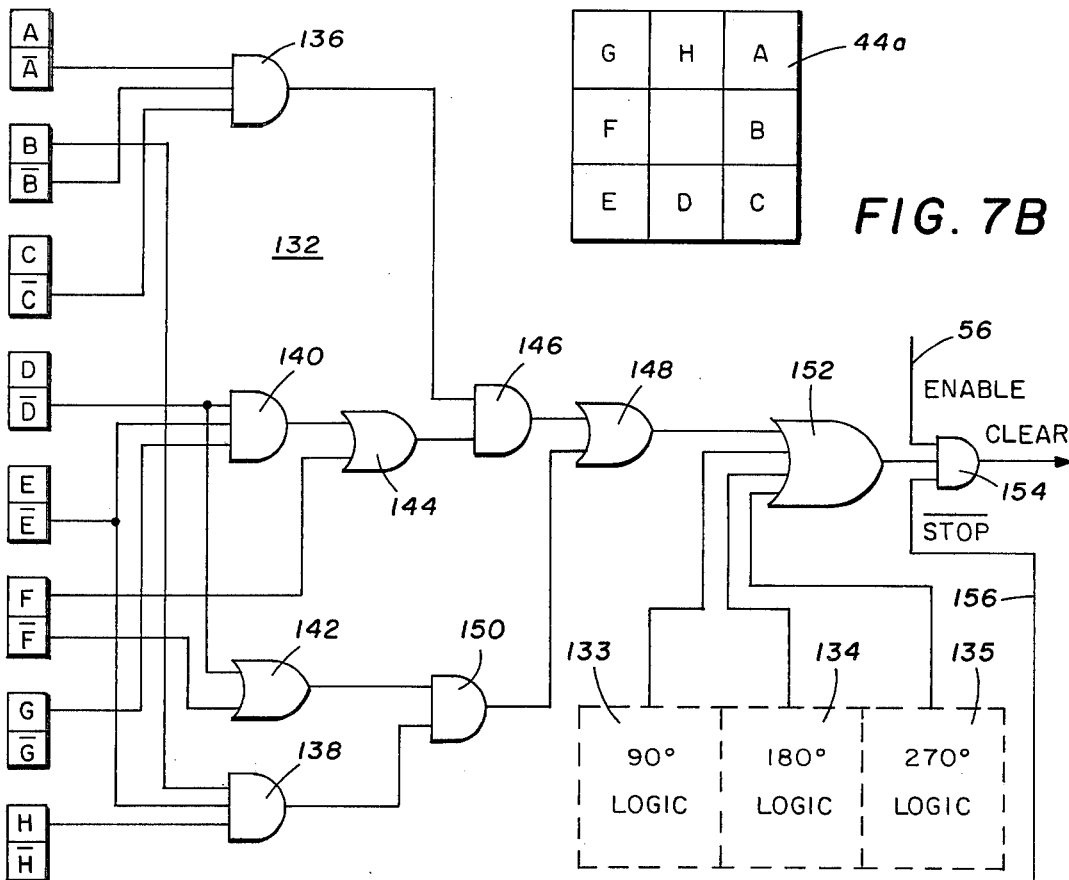
FIG. 7A is a detailed schematic of the thinning logic of FIG. 4 with the thinning process illustrated at FIG. 7B.
Figure 7A:
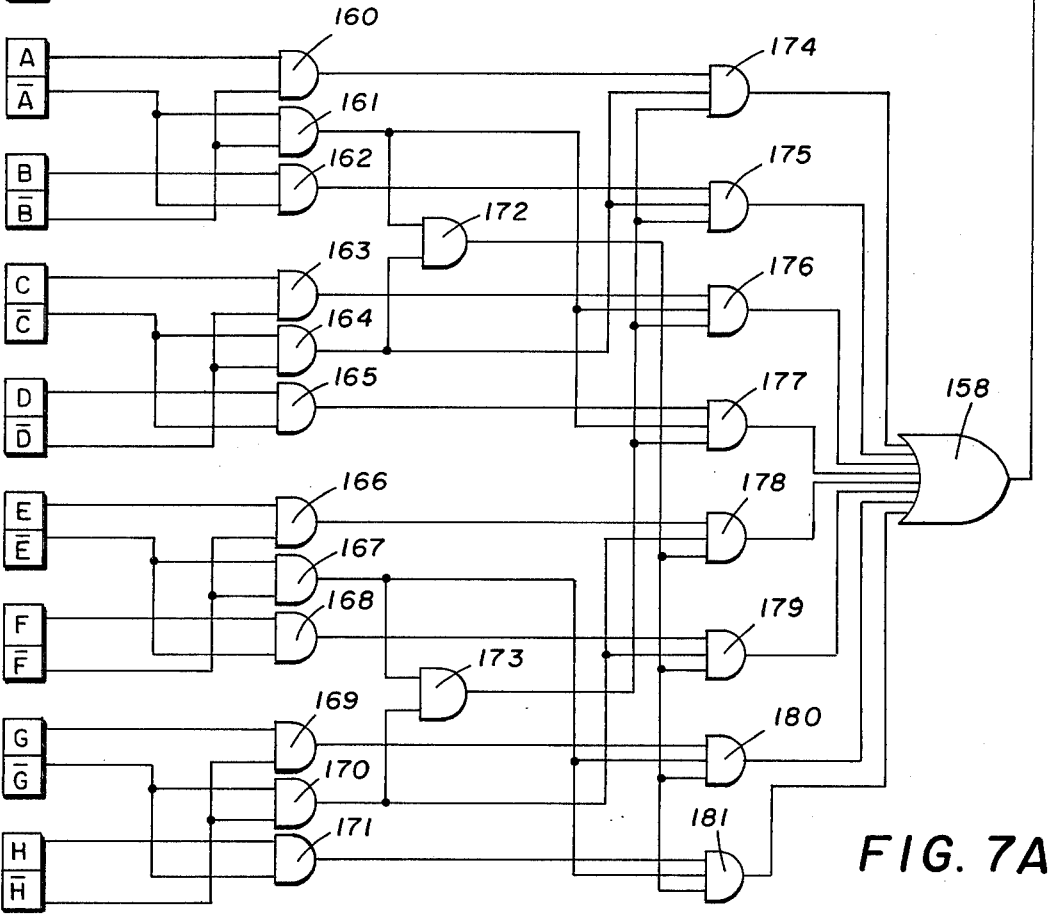

Referring to FIG. 7A, there is shown a schematic of the thinning logic 52 that is enabled by the control logic 50 during the first boundary tracing performed by the tracer logic 62. Each of the eight cells surrounding the center cell of the process array 44a, as shown in FIG. 7B, is connected to four identical logic circuits 132–135. Only the logic circuit 132 is shown in detail and includes an AND gate 136 connected to the cells A, B and C. Cell B is also connected to an AND gate 138 that receives additional inputs from the cells E and H. As illustrated in FIG. 7A, the data signal from each of the cell positions is connected directly to an input of a logic gate, or first inverted and the connected to an input of a logic element. The inverted signals are indicated conventionally using the bar above the cell letter identifier.

Cells D, E and G are connected to an AND gate 140 with the cell D also connected to an OR gate 142 having a second input to the inverted signal from cell F. The noninverted signal from cell F and the output of the AND gate 140 are connected to an OR gate 144. The output of the AND gate 136 and the OR gate 144 connect to inputs of the AND gate 146 having an output connected to one input of an OR gate 148 having a second input from an AND gate 150 connected to the OR gate 142 and the AND gate 138. Each of the logic elements illustrated for the circuit 132 is duplicated in the circuits 133, 134 and 135 with the output of the OR gate 148 for each of the circuits interconnected to an input of an OR gate 152. Each of the circuits 133–135 is identical to circuit 132 except that interconnection to the process array 44a is altered by rotating the array 44a by 90°, 180°, and 270°, respectively, to change the positioning of the eight cells A–H for interconnection to circuits 133–135. The output of the OR gate 152 is connected to one of three inputs of an AND gate 154 also receiving an enable signal on the line 56 from the control logic 50 and a $\overline{\text{stop}}$ signal on a line 156 from an OR gate 158.

The OR gate 158 is the output of logic also forming part of the thinning logic 52. Each of the eight cells of the process array 44a surrounding the center cell is interconnected to one or more of any array of AND gates 160–171. The output of each of the AND gates 160–171 is interconnected to an array of AND gates 172–181 with the output of the gates 174–181 interconnected to the OR gate 158.

Referrng to FIG. 8, there is shown a flow diagram of the thinning process as performed by the logic of FIG. 7 in conjunction with the tracer logic 62 and the logic control 50. After an image has been stored in the image plane 44, the thinning loop is entered by scanning the image during a subroutine 182 until an unused left border cell is located by the AND gate 58. Any time a left boundary point is encountered the corresponding position in the boundary marking plane 46 is changed to a logic one level, so that when the thinning process is finished and image scanning is resumed in search of a new segment of an image, the cells that are already processed will be ignored. The coordinates of the cell at the left border are saved in the X-start register 80 and the Y-start register 82 during a processing step 184. The corresponding cell position in the boundary marking plane of the left border is marked during a processing step 186 and the loop advances to an inquiry 188.

The inquiry "Can This Cell Be Removed" is answered by operation of the logic of FIG. 7 which applies two thinning rules to the cells of the process array 44a surrounding the center black cell. The first rule of the logic of FIG. 7 prevents any stroke of a signature from being broken into two or more pieces by unjudicious removal of a necessary black cell. The logic expression given in Table I defines when a center black cell can be turned into a white cell conditon by the logic of FIG. 7 evaluating the cells of the process area 44a. The numbers in Table I correspond to the letters in FIG. 7B in the following way: 1-G, 2-H, 3-A, 4-F, 5-center, 6-B, 7-E, 8-D, 9-C.

TABLE I $$X = \overline{1}\,\overline{2}\,\overline{3}\,(8 + 7\,\overline{6}\,9) + 2\,4\,\overline{9}\,(\overline{6} + \overline{8})$$
$$+\overline{3}\,\overline{6}\,\overline{9}\,(4 + 1\,\overline{7}\,\overline{8}) + 2\,6\,\overline{7}\,(\overline{4} + \overline{8})$$
$$\overline{7}\,\overline{8}\,\overline{9}\,(2 + 3\,\overline{1\,4}) + 6\,8\,\overline{1}(\overline{2} + \overline{4})$$
$$+\overline{1}\,\overline{4}\,\overline{7}\,(6 + 9\,\overline{2}\,\overline{3}) + 4\,8\,\overline{3}\,(\overline{2} + \overline{6})$$

The second test made by the logic of FIG. 7 insures that the end of a line will not be shortened by the removal of a black cell. If a candidate black cell has only one black cell in the immediate surrounding cells in the process array 44a, then the center cell cannot be changed to a white condition.

Whenever the inquiry 188 produces a positive response the center cell of the process array 44a is set to a white level in a processing step 190 and the tracer logic 62 steps to the next boundary point. Upon the location of the next boundary point in the processing step 190 the loop of FIG. 8 returns to the processing step 184 to again process through the inquiry 188 for the newly located boundary point.

Referring to FIG. 9, there is shown a series of sixteen possible conditions of the process array 44a as evaluated by the thinning logic of FIG. 7. The blank cell spaces in FIG. 9 can be either black or white, that is, these cells do not affect the test. With regard to the sixteen examples, the thinning logic, when applying the expression of Table I, enters the inquiry 188 that provides a positive result and the center cell, as indicated by the circled X, is changed to a white condition.

When the inquiry 188 responds in the negative, the loop of FIG. 8 advances to a processing step 192 which again activates the tracer logic 62 to step to the next located boundary cell. Upon the location of the next boundary cells, the loop advances to an inquiry 194 to ascertain if the boundary tracing has stepped to the starting position as stored in the start registers 80 and 82. This inquiry function is completed by the comparators 84 and 88, and as explained previously, if the X-address register 76 and the X-start register 80 both have the same address and the Y-address register 78 and the Y-start register 82 also have the same address then the thinning process has been completed and inquiry 194 responds positively. When the comparators 84 and 88 do not generate an equal condition signal the inquiry 194 provides a negative response thereby indicating that further scanning is possible and the loop of FIG. 8 returns to the processing step 186.

For a positive response from the inquiry 194 as indicated by the comparators 84 and 88 generating equal signals on the lines 86 and 90, respectively, the loop of FIG. 8 advances to a processing step 196 which shifts the address in the X-start register 80 and Y-start register 82 into the push-down registers 92 and 94, respectively.

Boundary tracing terminates when no more black cells can be changed to white cells from the segment of the image being traced by the tracer logic 62. The test for boundary tracing termination is implemented by always resetting the X-start register 80 and the Y-start register 82 each time a black cell is converted to a white cell condition and by a comparison with the respective X-address register and Y-address register.

The coordinates of the boundary point in the X-start register and Y-start register are shifted into the pushdown registers 92 and 94 before initiating a scanning of the image to locate the next segment of the image. This also enables the next phase of the signature processing, that is, encoding into a vector representation the skeletonized image after all pieces have been boundary traced and thinned.

Figure 10:
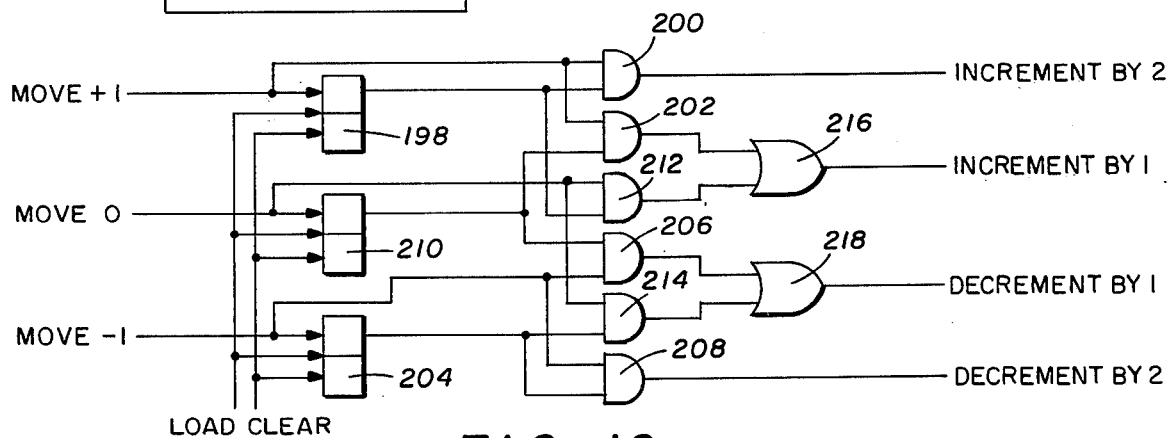
FIG. 10 is a detailed schematic of the vector logic of FIG. 4 for completing the process as illustrated by the flow diagram of FIG. 11.

Referring to FIG. 10, there is shown a schematic of the vector logic 68 for completing the final operation of signature compression, that is, generating and encoding a string of vector numbers that represent the skeletonized signature.

The skeletonized image in boundary traced once more by the logic of FIG. 6 and each transition from one black cell to its immediate neighbor is characterized by one of eight vectors in response to signals from the OR gates 122–124. The OR gate 122 generates the move plus one signal that is conneced to one input of a register 198 and one input of AND gates 200 and 202. The OR gate 123 provides the move minus one signal applied to a register 204 and one input and AND gates 206 and 208. The OR gate 124 provides the move zero signal to an input of a register 210 and one input of AND gates 212 and 214. An output of the register 198 is applied to a second input of the AND gates 200 and 212. For the register 204, an output is applied to the AND gates 208 and 214 and the output of the register 210 is applied to AND gates 202 and 206.

An output of the AND gate 200 is an increment by two signal generated on the line 74 to the vector register 72. Outputs from the AND gates 202 and 212 are applied to an OR gate 216 that provides an increment by one signal, also over the line 74 to the vector register 72. A decrement by two signal is generated at the output of the AND gate 208 and a decrement by one signal appears at the output of an OR gate 218 having inputs from the AND gates 206 and 214. Both the decrement by one and decrement by two signals are applied to the vector register 72.

Figure 11:
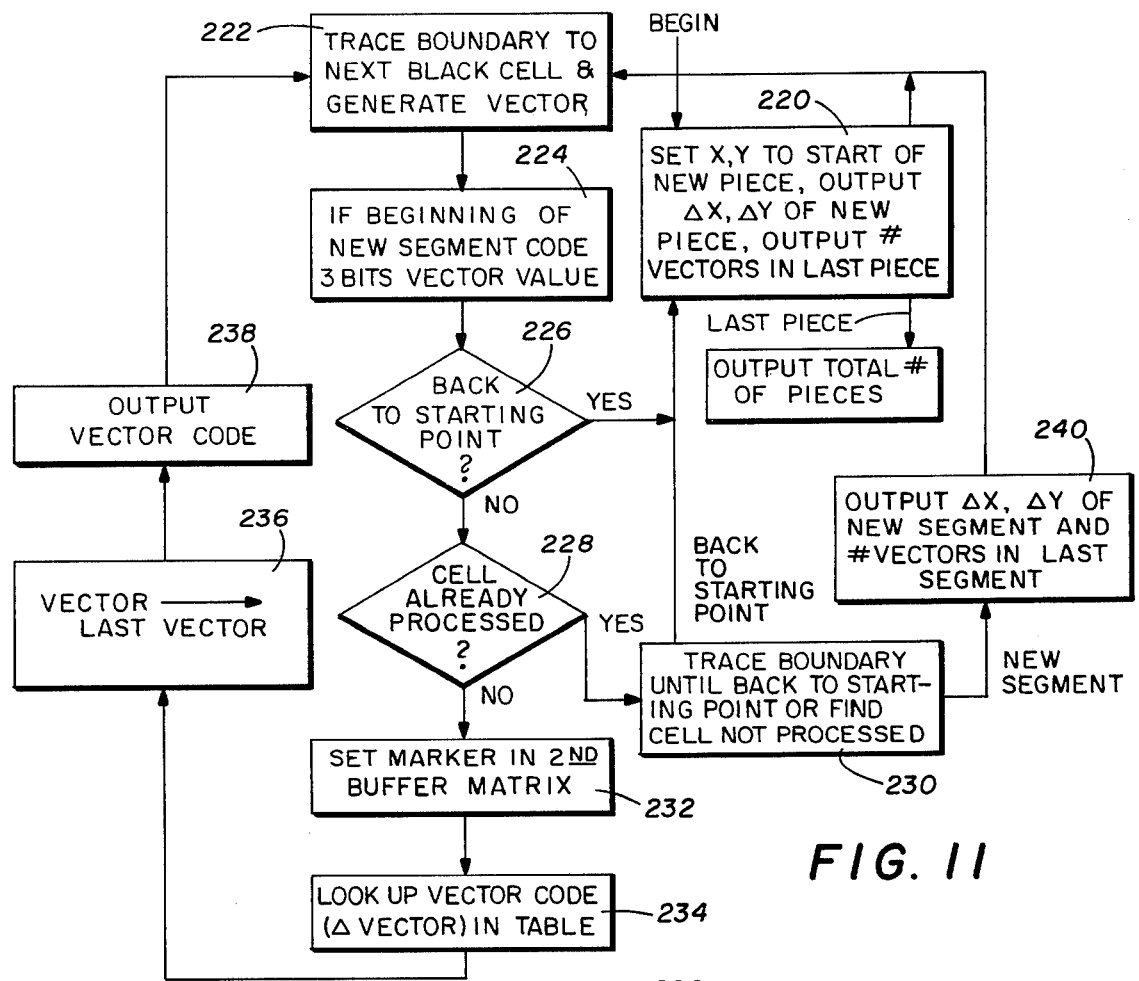
FIG. 11 is a flow chart of the vector encoding operation of the system of FIG. 4.

Referring to FIG. 11, there is shown a flow chart, beginning with the processing step 220, for generating and encoding a string of vector numbers using the tracer logic of FIG. 6 with the vector logic of FIG. 10 and the control logic 50. The vector encoding process initially boundary traces pieces of the signature skeleton, and at each step a three bit code is generated that gives the location of the next black cell.

At the beginning of each segment of an image, the processing step 220 is initialized to clear the segment count register 98, the vector count register 100, and the vector register 72. In addition, the X-start register 80 and the Y-start register 82 are initialized to the start of the first piece of the signature by transferring addresses from the bottom of the X push-down register 92 and the Y push-down register 94. The image plane 44 is shifted by the control logic 50 and at the same time the X-address register 76 and the Y-address register 78 are incremented or decremented until the contents of these registers are the same as the contents of the respective X-start register and Y-start register. This positions the first black cell into the center position of the process array 44a and the difference between the X-address and the Y-address of the first black cell and the next black cell of the next segment is output to the coding logic 96. If the present segment being analyzed is the first of the signature, then the previous coordinates are assumed to be (0, 0). Also output during the processing step 220 is the number of vectors generated to identify the prior piece of the signature evaluated. This information is transferred from the logic register 72 to the encoding logic 96.

When the present segment of the signature being analyzed is not the last, the vector generating an encoding process advances to a processing step 222 which initializes the boundary tracing logic of FIG. 6 which is now used to guide subsequent shifting of the image plane 44 from cell to adjacent cell in a complete circuit of the image segment until, once again, the X and Y address registers are equal to the X and Y start registers. During the processing step 222, each black cell identified by the tracing logic will be represented by a vector generated by the vector logic of FIG. 10.

Referring to FIG. 5A, the eight possible vectors that will be generated by the vector logic are numbered from 0 to 7 and represent vectors in 45° increments in a clockwise direction beginning with the vector number 0 pointing to the right. Each vector extends from the present black cell identified at the center of the process array 44a by the tracer logic to the next black cell in sequence which is one of the eight neighboring cells. Because of the nature of the thinning process, certain vector sequences do not occur and further each vector in the sequence can be derived from the previous vector by identifying a change between the previous vector and the vector to be generated. For the even number vectors of FIG. 5A (vector numbers 0, 2, 4 and 6) which point right, down, left and up, respectively, there are only three next vector directions which will occur as follows: a vector with the same value, a vector having a delta of −1, or a vector with a delta of +1. For the odd number vectors (vectors numbered 1, 3, 5 and 7), five possibilities exist for a subsequent vector. The succeeding vector can have a delta value of −2, −1, 0, +1 or +2. The encoding process completed by the logic of FIG. 10 translates the vector sequence into delta values as established by the increment signals from the AND gates 200 through 208 and the OR gates 216 and 218. Assuming that the current black cell has not already been encoded and that it is not a starting point, the logic of FIG. 10 generates a delta value representing a vector in accordance with the Table II.

TABLE II

|             | Next Vector | | | | | | | |
|-------------|---|---|---|---|---|---|---|---|
|             | 0 | 1 | 2 | 3 | 4 | 5 | 6 | 7 |
|             | 0 | 0 | +1 | X | X | X | X | X | −1 |
|             | 1 | −1 | 0 | +1 | +2 | X | X | X | −2 |
|             | 2 | X | −1 | 0 | +1 | X | X | X | X |
| last vector | 3 | X | −2 | −1 | 0 | +1 | +2 | X | X |
|             | 4 | X | X | X | −1 | 0 | +1 | X | X |
|             | 5 | X | X | X | −2 | −1 | 0 | +1 | +2 |
|             | 6 | X | X | X | X | X | −1 | 0 | +1 |
|             | 7 | +1 | +2 | X | X | X | −2 | −1 | 0 |

Increment Signals (1, 2)
Decrement Signals (−1, −2)

With reference to Table II, a previously generated vector number is given at the left column and the next vector number to be generated is given at the top row. For example, if the last vector generated was vector 3 of FIG. 5A and the decrement by 2 signal is generated at the output of the vector logic, then the present vector would be vector 1. The numbers within the table identify one of the five signals generated by the vector logic from the vector register 72. It should be understood that the vector number itself is not generated but rather only the delta values are encoded into three bits.

Following the processing step 222, the sequence of FIG. 11 advances to the processing step 224 to be completed at the beginning of each new segment when the actual vector value must be generated since no previous vector exists from which to derive a delta value. Thus, the processing step 224 is only initiated for new segments of a signature image.

During the tracing function, it is also possible to identify the same black cell more than once and in order to prevent encoding any cell more than once each time a cell is processed the corresponding address on the boundary marking plane 46 is encoded. When the same cell is identified as having been previously encoded, the vector sequence advances to the inquiry 226 and the inquiry 228 produces a positive response to initiate the processing step 230. Processing step 230 continuously traces the image under control of the tracer logic 62 until either the starting point is reached, signaled by the X and Y comparators 84 and 88, or a new segment is found which constitutes a cell not previously processed. If processing step 230 ends at the starting point then processing step 220 is initiated to start a new segment. It is during the step 232 when the corresponding position of a present black cell is marked in the boundary marking plane 46.

After completing the markings of the boundary plane 46, the sequence advances to the processing step 234 to set the vector register 72 in accordance with Table II. The actual computation as processed by the logic of FIG. 10 is completed in a processing step 234 which sets the vector register 72. At this time the vector count register 100 and the segment count register 98 are incremented, the former to reflect the number of vectors used to encode a segment and the latter to indicate the number of segments of an image. The logic of FIG. 10 also effectively performs the operation of processing step 236 which retains the value of the last vector to facilitate the vector look-up in Table II. In processing step 238 vector codes are output by the output encoding logic 96.

During the running of the processing step 230, if a new segment is identified then the delta X and delta Y address of the new segment as held in the push-down registers 92 and 94 is output to encoding logic 96 in a processing step 240. Also, the number of vectors in the previous segment, as registered in the vector count register 100, is transferred to the encoding logic 96. After completing the processing step 240, and a new segment of an image is identified, the sequence advances to the step 222.

The encoded skeletonized image is applied to the encoding logic 92 where the vector numbers, the X and Y start coordinates of each segment, the number of vectors in each segment from the count register 100, and the number of segments from the segment count register 98 are serially encoded into a bit stream as shown in FIG. 3E. This serial data is transmitted to the disc storage 20 wherein it is maintained for future retrieval and decompression.

Figure 12:
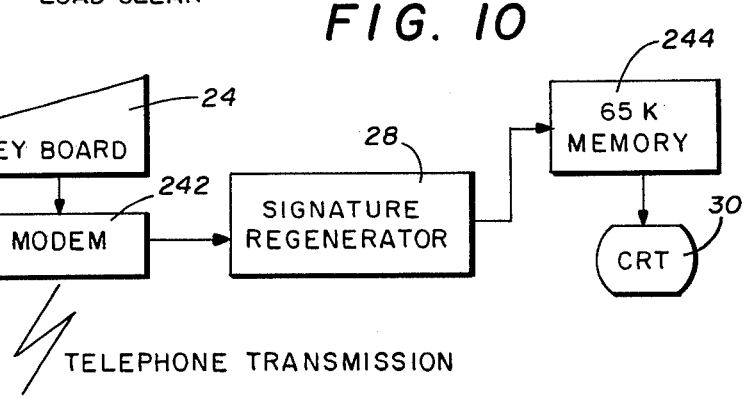
FIG. 12 is a block diagram illustration of the display system for regenerating graphic data on a CRT display.

Referring to FIG. 12, there is shown one of the remote stations of the display subsystem 18 including the keyboard 24, signature regenerator logic 28 and the cathode ray tube display 30. An operator at the keyboard 24 addresses the disc storage 20 through the retrieval computer 22. For long transmission distances, a modulator/demodulator (modem) 242 is interconnected between the keyboard 24, the signature regenerator 28 and the retrieval computer 22. Regenerated black/white signature image data from the output of the regenerator 28 is applied to a temporary storage memory 244 interconnected between the signature regenerator and the cathode ray tube display 30.

The decompression of regeneration process utilizes the information from the disc storage 20 including the number of segments in an image, the X and Y coordinates of the start of each segment of a signature, and the number of vectors included in each segment. Initially, the X and Y coordinates of the first black bit of a segment are stored in the memory 244 and the signature regenerator 28 proceeds to map out the remainder of the first segment using the vector values. The signature regenerator 28 utilizes each of the vectors of the first segment to regenerate black data bits for storage in the memory 244. Each time another segment of a signature is identified the process repeats starting with the first black cell and using the vector information for regenerating each additional signature segment. This regeneration process continues until the entire signature has been reconstructed in the memory 244. Upon completion of the reconstruction of a signature in the memory 244, the reconstructed data bits are transferred to the cathode ray tube display 30 where a regenerated signature, as shown in FIG. 3F, is displayed.

Figure 13:
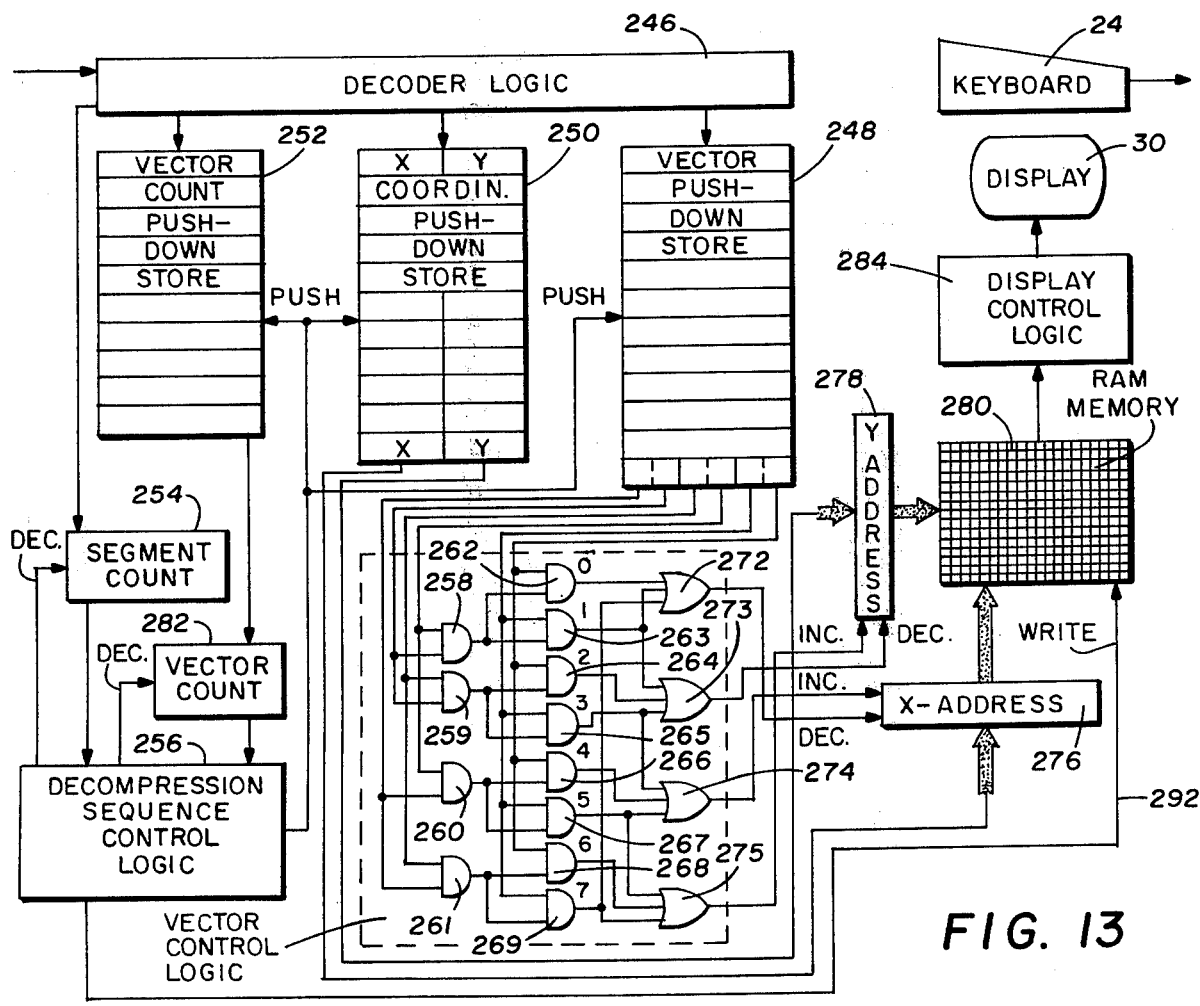
FIG. 13 is a logic diagram of the decompression unit of the display system of FIG. 12.

Referring to FIG. 13, there is shown a detailed schematic of the display subsystem 18 including the keyboard 24 and the CRT display 30. Binary data from the disc storage 20 is applied to decoder logic 246 in the form of a serial-to-parallel register. Data input to the decoder logic 246 is separated with the vector numbers input to a vector push-down storage register 248, the X and Y coordinates of the first black bit of a signature segment are input to a push-down storage register 250, the number of vectors in a signature segment is input to a vector count push-down storage register 252, and the number of segments in a signature is input to a segment count register 254. Each of the push-down storage registers 248, 250, and 252 is sequenced by control signals from decompression control logic 256 that also provides a decrementing signal to the segment count register 254. Under control of the logic 256, a vector number from the push-down storage register 248 is applied to decoding logic including AND gates 258-261 having outputs selectively interconnected to a bank of AND gates 262-269 where the outputs of the AND gate 262 is the zero numbered vector of FIG. 5A and each successive higher numbered AND gate represents the next vector clockwise. Output signals from the vector control logic are generated through OR gates 272-275.

Outputs from the OR gates 272 and 274 are applied to an X-address register 276 and outputs from the OR gates 273 and 275 are applied to inputs of a Y-address register 278. As applied to the X-address register 276, the output of the OR gate 272 decrements the present address in the register while the output of the OR gate 274 increments the present address. Similarly, the output of the OR gate 275 increments the Y-address register 278 and the output of the OR gate 273 decrements the present address in the register.

Initially, the address in the register 276 is set by the X-coordinate data shifted from the push-down storage register 250 and the initial address in the Y-address register 278 is likewise set from the data shifted from the push-down register 250.

Address data in the registers 276 and 278 is applied to a random access memory 280 to set black cells into the memory to regenerate a binary bit pattern representing the original signature as shown in FIG. 3A. Setting the cells in the memory 280 is under control of the sequence control logic 256 that also controls the transfer of data from the push-down storage registers 248 and 250 through the vector control logic.

A reconstruction of one signature segment continues for the number of vectors identified and stored in the push-down storage register 252. The vector count shifted from the push-down storage register 252 sets a vector count register 282 connected to the control logic 256. Each time a cell of a segment is set in the memory 280 the control logic 256 decrements the count register 282. When the count in the register 282 is decremented to zero one segment of a signature has been regenerated in the memory 280.

Upon completion of the regeneration of an image by setting black cells in the memory 280, display control logic 284 scans the memory 280 for black data cells to generate display signals to the CRT display 30. The CRT display 30 is of a conventional design with the control logic 284 providing the necessary sweep and amplitude signals to a display.

Figure 14:
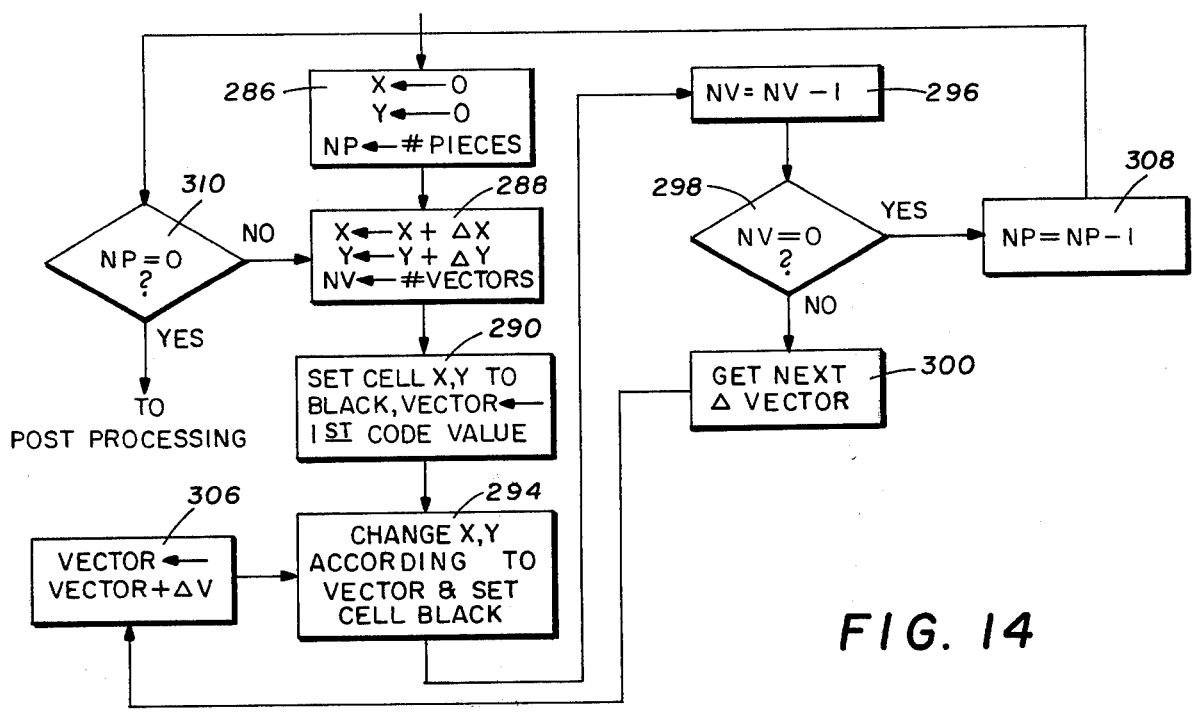
FIG. 14 is a flow chart of the regeneration process for reconstructing graphic data from encoded coordinates and vector values on the CRT display of FIG. 12.

Referring to FIG. 14, there is shown a flow diagram of the operation of the control logic 256 for regenerating black/white data cells in the memory 280. Initially, the control logic 256, during a processing step 286, sets the number of segments of a signature to be reconstructed into the segment count register 254. Following the setting of the count register 254, the regeneration process advances to a processing step 288 where the vector count data from the push-down storage register 252 is applied to the vector count register 282 and the X and Y coordinate data from the push-down storage register 250 is applied to the address registers 276 and 278 to set the initial address of the first black bit to be set in the memory 280.

The regeneration process continues at steps 290 and 294 to convert the vector data into incrementing or decrementing signals applied to the registers 276 and 278. The control logic 256, during the step 290, provides a write signal on a line 292 to set the first black cell in the memory 280. The control sequence then advances to a processing step 294 where the incremented or decremented values of the original address in the registers 276 and 278 are used to set the next cell in the memory 280.

With the setting of the next cell in the memory 280, the control logic 256 advances to a processing step 296 wherein the count vector in the register 282 is decremented by one. Following the decrementing of the count register 282, an inquiry 298 is made to determine if the previously processed vector is the last vector of a segment. If additional vectors exist for the present signature segment being processed, a count remains in the register 282 and the control logic advances to a processing step 300.

During the step 300 the control logic 256 generates push signals to the register 248 to advance the next vector data to the vector control logic. Step 306 then updates the vector and returns the sequence to the step 294 and then to the processing step 296. This recirculating sequence is followed for each vector shifted from the push-down storage register 248.

When the vector count in the register 282 is decremented to zero, the inquiry 298 provides a positive response to advance the sequence to a step 308. During the processing step 308, the count register 254 is decremented to indicate that one more segment of the signature has been processed to the memory 280. Upon decrementing of the count register 254, the sequence advances to an inquiry 310 to evaluate if the count in the register 254 equals zero. When additional features of the signature are to be processed, inquiry 310 produces a negative response to return the control logic to the processing step 288. At this point a push signal is generated by the control logic 256 which causes new data to be transferred from the vector count push-down store 252 and the coordinate push-down store 250 to the vector count register 282 and the address registers 276 and 278. If the inquiry 301 provides a positive response, indicating that all pieces of the signature are now processed into the memory 280, the control logic 256 advances to a post processing sequence to transfer the black data bits from the memory 280 through the control logic 284 to activate the display 30.

Summarizing the decompression process, the decompression sequence control logic 256 uses information in the push-down storage registers 248, 250 and 252 to reconstruct the image in the random access memory 280 which is a two dimensional memory with one bit storage per cell. Separate segments of the image are reconstructed one at a time into the memory 280. A black cell is placed in the memory 280 at the start of each segment of the reconstructed image, and vector data is then used by the vector control logic to reconstruct and locate in the memory 280 additional bits of the signature. Each vector is sequenced out of the vector push-down storage register 248 and utilized by the vector control logic to increment and decrement the address registers 276 and 278. Each time a new vector is sequenced a black cell is written into the memory 280 and the vector count register 282 is decremented. When the vector count register 282 reaches a count of zero, the present image segment is completely reconstructed in the memory 280. At this time, a new segment is processed to the memory 280.

This continues until the segment count register has been decremented to zero at which time the reconstructed image in the memory 280 is transferred to the display 30.

In addition to signature reconstruction, gray scale images may also be data compressed and reconstructed. A potential application for gray scale image compression, storage and retrieval is for personal identification. The written signature and facial picture are now considered the most effective and commonly accepted means of personal identification for secure entry or verified monetary transactions.

Referring to FIG. 15, an original facial image as shown in FIG. 15a is scanned, digitized and converted into four subimages with the most significant bits of the digitized data forming the image of FIG. 15b, the next most significant bits forming the image of FIG. 15c, and next least significant bits forming the image of FIG. 15d, and the least significant bits forming the image of FIG. 15e. These four subimages are processed in parallel for subsequent storage in serial form.

The original image of FIG. 15a, after scanning and digitizing, consists of a matrix of four bit words, one word for each picture element, which defines one of sixteen gray levels for that element. The four binary images of FIGS. 15b–15e are formed from the original gray level image by separating the four bits of each picture element. As will be observed from FIG. 15, important details of the original are contained in the three most significant bit images and the image of the least significant bits carries somewhat less real information.

Referring to FIG. 16, there is shown a logic block diagram for processing the image of FIG. 15a for compression, storage and regeneration at a display. The image of FIG. 15a is raster scanned by an optical scanner 312 in a regular, ordered, top to bottom, left to right fashion. The raster scan signals are digitized in a network 314 and each digitized binary word from the optical scanner is separated into the most significant bit, the next most significant bit, the next least significant bit and the least significant bit.

The most significant bit from each number is applied to an MSB binary image matrix 316 with the next most significant bit applied to an N-MSB binary image matrix 318, the next least significant bit is applied to an N-LSB binary image matrix 320 and the least significant bit is applied to an LSB binary image matrix 322.

The binary image in the matrix 316 is compressed by compression logic 324 which is similar to the logic described in FIG. 4 except with the thinning logic 52 disabled. The image black cells are boundary traced to generate and encode vector data in encode logic 326. This is the same information as provided by the encoding logic 96 and is output to a disc storage 328. For the next most significant binary image stored in the matrix 318, compression is completed by compression logic 330 and the skeletonized image is used to generate vectors and encode data in logic 332 to the disc storage 328. Simultaneously with the processing of the other binary images, the next least significant image stored in the matrix 320 is compressed by logic 334 and vector encoded by logic 336. Likewise, the least significant bit of the binary image in the matrix 322 is compressed by compression logic 338 with vectors encoded by logic 340.

Each of the compression and encoding processes for the four images in the matrices 316, 318, 320 and 322 is similar. The matrix is scanned until the left boundary point is identified which is any black cell having a white neighbor to the left that has not previously been processed. This is similar to that described previously with regard to signature tracing.

Upon completion of each boundary trace, the search of the binary matrix is resumed in an attempt to find a new, unused, left boundary point. In this way, the system finds and processes separate boundaries of each image although boundaries that are quite small are ignored; that is, they are just not encoded. This is equivalent to deleting very small black and white areas from the image which are hardly notable but which would contribute significantly to the number of bits required to store the image.

The encoded image from each of the four parallel paths consists of X and Y coordinates for each boundary starting point, and a series of vectors that describe the boundary, this for each boundary in each of the four binary images. This data is combined into compact storage in the disc storage 328.

To reconstruct the image of FIG. 15a, the stored data is recalled by regenerate logic 342 that is similar to the logic of FIG. 13. The image is thus reconstructed by retracing the boundary paths and setting the boundary cells for each binary image in the appropriate matrix bit plane. The reconstructed binary image is then displayed with the correct gray level for each picture element of the image reconstructed.

While several embodiments of the invention, together with modifications thereof, have been described in detail herein and shown in the accompanying drawings, it will be evident that various further modifications are possible without departing from the scope of the invention.

What is claimed is:

1. Apparatus for compressing a pattern of digitized input data having a multiple bit width for removal of excess information and converting into a vector pattern, comprising in combination:
   an image matrix for storing each value of digitized input data produced by pattern scanning.
   a process array within said image matrix through which the digitized input data in the image matrix is shifted,
   means for scanning each bit of the input data in the image matrix and generating a boundary signal at a transition between a data bit of a first value and a data bit of a second value,
   means for tracing a boundary outlined by the stored input data during a tracing sequence in response to the boundary signal in a single bit sequence,
   means for changing the value of excess information bits during the tracing sequence from the first value to the second value,
   means responsive to each information bit of the first value after completion of the tracing sequence to generate an encoded representation of vectors having a direction based on surrounding data bits of the first and second values, and
   means for storing the encoded representations of the vectors in recoverable memory.

2. Apparatus for compressing a pattern of digitized input data as set forth in claim 1 wherein said means for tracing includes means for repeating the single bit sequence for the boundary outlined until all redundant information bits are changed from the first value to the second value.

3. Apparatus for compressing a pattern of digitized input data as set forth in claim 2 including means for storing in a boundary matrix a signal for each boundary signal in a position corresponding to the information bit position in the image matrix.

4. Apparatus for compressing a pattern of digitized input data as set forth in claim 1 wherein said means for tracing includes means for repeating the single bit sequence until a one bit width image of the first value remains in said image matrix.

5. Apparatus for compressing a pattern of digitized input data as set forth in claim 1 wherein said means for changing includes means for logically interconnecting an information bit during the sequence with surrounding information bits of the image matrix to evaluate for an excess information bit.

6. Apparatus for compressing a pattern of digitized input data as set forth in claim 1 wherein said means for scanning includes means for interrupting the scanning of the image matrix in response to the generation of the boundary signal.

7. Apparatus for compressing a pattern of digitized input data as set forth in claim 1 wherein said means for changing includes means for changing the value of an information bit from the first value to the second value when the contents of adjoining bit positions in said image matrix form any one of sixteen predetermined patterns.

8. Apparatus for compressing a pattern of digitized input data as set forth in claim 1 wherein said means responsive to each information bit includes means for producing one of eight encoded representations of a vector based on the immediately preceding encoded representation of a vector.

9. Apparatus for compressing digitized input data of a signature pattern having a multiple bit width for removal of excess information into a vector pattern, comprising in combination:
   means for storing in an image matrix each value of digitized input data produced by scanning the signature pattern,
   a process array within said image matrix through which the digitized input data in the image matrix is shifted,
   means for scanning each bit of the input data in the image matrix and generating a boundary signal at a transition between the data bit of a first value and a data bit of a second value, means for tracing a boundary outlined by the stored input data during a tracing sequence in response to the boundary signal in a single bit sequence, means for changing the value of excess information bits during the tracing sequence from the first value to the second value, means for reactivating said means for scanning to generate a second boundary signal at a transition between a data bit of a first value and a data bit of a second value not previously scanned and producing a boundary signal, means for reactivating said means for tracing and means for changing to change the value of excess information bits during the tracing of a second boundary outlined by the stored input data, and means responsive to each information bit of the first value after completion of all tracing sequence to generate an encoded representation of vectors having a direction based on surrounding data bits of first and second values, and memory means for storing the encoded representations of the vectors in recoverable memory.

10. Apparatus for compressing digitized input data of gray level image pattern into a vector pattern, comprising in combination:

first means for storing each bit of digitized input data produced by scanning the gray level image, means for subdividing the stored digitized input data into a plurality of binary images from the most significant binary images to the least significant binary images, means for storing in an image matrix each bit of the digitized input for each of the binary images, a process array within said image matrix through which the digitized input data in the image matrix is shifted, means for scanning each binary image of input data and generating boundary signals at a transition between a data bit of the first value and a data bit of a second value, means for tracing the boundary outlined by the stored input data during a tracing sequence for each binary image in response to the boundary signal associated therewith in a single bit sequence, means responsive to each information bit of the first value at the completion of the tracing sequence for each binary image to generate an encoded representation of vectors for each such image having a direction based on surrounding data bits of the first and second values, and memory means for storing the encoded representation of the vectors in recoverable memory.

11. An apparatus for compressing a pattern of digitized input data having a multiple bit width for removal of excess information and converting into a vector pattern comprising:

a pair of two dimensional shift registers, the first of which stores the input data and the second of which stores digital marking information denoting processed cell positions to make possible a particular non-redundant processing sequence, a pair of process arrays one each in the two dimensional shift registers and through which data is shifted, means for scanning each bit of the input data and generating a boundary signal by a transition between a data bit of the first value and a data bit of the second value, means for tracing a boundary outlined by the stored input data during a tracing sequence in response to the boundary signal and a single bit, means for storing bits in the second two dimensional shift register which mark locations already processed, means for changing the value of excess information bits during the tracing sequence from the first value to the second value, means responsive to each information bit of the first value after completion of the tracing sequence to generate an encoded representation of vectors having a direction based on surrounding data bits of the first and second values.

* * * * *